United States Patent
Masaoka et al.

(10) Patent No.: US 8,841,226 B2
(45) Date of Patent: Sep. 23, 2014

(54) DIELECTRIC CERAMIC COMPOSITION

(71) Applicant: TDK Corporation, Tokyo (JP)

(72) Inventors: Raitarou Masaoka, Tokyo (JP); Toshio Sakurai, Tokyo (JP); Tomohiro Arashi, Tokyo (JP); Kyung-Ku Choi, Tokyo (JP); Kiyoshi Hatanaka, Tokyo (JP)

(73) Assignee: TDK Corporation, Tokyo (JP)

( * ) Notice: Subject to any disclaimer, the term of this patent is extended or adjusted under 35 U.S.C. 154(b) by 12 days.

(21) Appl. No.: 13/677,763

(22) Filed: Nov. 15, 2012

(65) Prior Publication Data

US 2013/0150226 A1    Jun. 13, 2013

(30) Foreign Application Priority Data

Dec. 12, 2011  (JP) .................. 2011-271301
Oct. 3, 2012   (JP) .................. 2012-221187

(51) Int. Cl.
*C04B 35/468*   (2006.01)
*C04B 35/20*    (2006.01)

(52) U.S. Cl.
USPC .................. 501/139; 501/122; 501/138

(58) Field of Classification Search
USPC ........................ 501/137, 138, 139
See application file for complete search history.

(56) References Cited

U.S. PATENT DOCUMENTS

| | | | |
|---|---|---|---|
| 7,517,823 B2 * | 4/2009 | Arashi et al. .................. | 501/138 |
| 7,655,588 B2 * | 2/2010 | Arashi et al. .................. | 501/139 |
| 8,183,171 B2 * | 5/2012 | Arashi et al. .................. | 501/139 |
| 2007/0213202 A1 * | 9/2007 | Arashi et al. .................. | 501/138 |
| 2010/0244987 A1 * | 9/2010 | Sakurai et al. ................ | 333/185 |
| 2010/0248927 A1 * | 9/2010 | Arashi et al. .................. | 501/32 |

FOREIGN PATENT DOCUMENTS

JP    B2-3680765    8/2005
JP    A-2010-235327   10/2010

* cited by examiner

*Primary Examiner* — Karl Group
(74) *Attorney, Agent, or Firm* — Oliff PLC

(57) ABSTRACT

A dielectric ceramic composition includes a component represented by composition formula $\{\alpha(xBaO \cdot yNd_2O_3 \cdot zTiO_2) + \beta(2MgO \cdot SO_2)\}$ as a main component and zinc oxide, boron oxide, and a glass having a softening point equal to or lower than a certain temperature as minor components with respect to the main component. In the dielectric ceramic composition, x, y, and z that respectively represent molar ratios of BaO, $Nd_2O_3$, and $TiO_2$ are in certain ranges and $\alpha$ and $\beta$ that represent volume ratios of subcomponents ($xBaO \cdot yNd_2O_3 \cdot zTiO_2$ and $2MgO \cdot SiO_2$) in the main component are in certain ranges. When the minor components are respectively represented by aZnO, $bB_2O_3$, and cglass, a, b, and c that represent mass ratios of the respective minor components to the main component are in certain ranges.

4 Claims, 5 Drawing Sheets

DIELECTRIC CERAMIC COMPOSITION

BACKGROUND OF THE INVENTION

1. Field of the Invention

The present invention relates to a dielectric ceramic composition.

2. Description of the Related Art

In recent years, small devices having good high-frequency properties have been required as electronic devices, such as filters, resonators, and capacitors, used in high-speed large-capacity mobile communication devices such as smartphones. The most commonly used type of such a device is a surface mount device (SMD) including conductors such as electrodes and wires therein (hereinafter, conductors such as electrodes and wires included in high-frequency devices are referred to as "internal conductors").

To decrease the cost of the devices, it is desirable to use an inexpensive conductor with low resistance, such as Ag, as the internal conductor. Various dielectric ceramic compositions having low-temperature sintering properties that allow Ag having a melting point of 961.9° C. to be used as the internal conductor have been proposed. For example, a dielectric ceramic composition mainly composed of a BaO-rare earth oxide-$TiO_2$-based compound has a high relative permittivity ($\in$r) and a high Q value, and a resonator or the like formed using such a dielectric ceramic composition has a low resonant frequency temperature coefficient ($\tau$f). Thus, such dielectric ceramic compositions are being widely studied.

For example, Japanese Unexamined Patent Application Publication No. 2010-235327 and Japanese Patent No. 3680765 each disclose a dielectric ceramic composition mainly composed of a BaO-rare earth oxide-$TiO_2$-based compound having low-temperature sintering properties so that Ag or an alloy mainly composed of Ag can be used as an internal conductor.

Japanese Unexamined Patent Application Publication No. 2010-235327 discloses a dielectric ceramic composition including a component represented by composition formula $\{\alpha(xBaO.yNd_2O_3.zTiO_2)+\beta(2MgO.SiO_2)\}$ as a main component and zinc oxide, boron oxide, a glass having a softening point equal to or lower than a certain temperature, and silver as minor components. In the dielectric ceramic composition, the mass ratios of the minor components to the main component are certain mass ratios. Japanese Patent No. 3680765 discloses a dielectric ceramic composition including a BaO—$TiO_2$—$ReO_{3/2}$-based ceramic composition (Re is a rare-earth element) represented by $xBaO-yTiO_2-zReO_{3/2}$ and a glass composition containing silicon oxide, boron oxide, magnesium oxide, zinc oxide, aluminum oxide, lithium oxide, and an alkaline-earth oxide (at least one of Ba, Sr, and Ca).

However, in the case where an electronic device such as a capacitor is produced using the above-described dielectric ceramic composition including a BaO-rare earth oxide-$TiO_2$-based compound as a main component and zinc oxide and boron oxide as minor components or glass components, if the content of zinc oxide is high, the sintering does not sufficiently proceed due to the zinc oxide having a high melting point and the density after the sintering tends to be low. In addition, it is possible that the zinc oxide does not sufficiently react with other components and thus the elution of unreacted zinc oxide occurs in a process. If the content of boron oxide is high, the elution of boron may occur in a process. If the content of glass is excessively high, the elution of a glass component may occur in a process.

The elution of zinc oxide and boron oxide degrades electrical properties and the power loss in high-frequency devices excessively increases. Therefore, it is difficult to handle a composition having low chemical resistance in a process.

SUMMARY OF THE INVENTION

Accordingly, it is a main object of the present invention to provide a dielectric ceramic composition for high-frequency devices that has good low-temperature sintering properties, has a specified composition range which can maintain the Q characteristics and a specified composition range which can satisfy high chemical resistance, and can achieve both the above-described properties.

As a result of thorough studies to achieve the above object, the inventors of the present invention have found a composition in which a component represented by composition formula $\{\alpha(xBaO.yNd_2O_3.zTiO_2)+\beta(2MgO.SiO_2)\}$ is included as a main component; x, y, and z that respectively represent the molar ratios of BaO, $Nd_2O_3$, and $TiO_2$ are in certain ranges; and $\alpha$ and $\beta$ that represent the volume ratios of subcomponents ($xBaO.yNd_2O_3.zTiO_2$ and $2MgO.SiO_2$) in the main component are in certain ranges. Furthermore, the inventors have found that, by specifying the amounts of zinc oxide, boron oxide, and a glass having a softening point equal to or lower than a certain temperature, which serve as minor components with respect to the main component, within certain ranges, a dielectric ceramic composition for high-frequency devices is produced that can be sintered at a low temperature, has a specified composition range that can maintain the Q characteristics and a specified composition range that can satisfy high chemical resistance, and can achieve both the above-described properties. Thus, the present invention has been completed.

A dielectric ceramic composition according to an aspect of the present invention includes a component represented by composition formula $\{\alpha(xBaO.yNd_2O_3.zTiO_2)+\beta(2MgO.SiO_2)\}$ as a main component; and zinc oxide, boron oxide, and a glass having a softening point of 570° C. or less as minor components with respect to the main component. In the dielectric ceramic composition, x, y, and z that respectively represent molar ratios of BaO, $Nd_2O_3$, and $TiO_2$ satisfy 14 (mol %) $\leq$ x $\leq$ 19 (mol %), 12 (mol %) $\leq$ y $\leq$ 17 (mol %), 65 (mol %) $\leq$ z $\leq$ 71 (mol %), and x+y+z=100; $\alpha$ and $\beta$ that represent volume ratios of subcomponents in the main component satisfy 35 (vol %) $\leq$ $\alpha$ $\leq$ 65 (vol %), 35 (vol %) $\leq$ $\beta$ $\leq$ 65 (vol %), and $\alpha$+$\beta$=100; and, when the minor components are respectively represented by aZnO, $bB_2O_3$, and cglass, a, b, and c that represent mass ratios of the respective minor components to the main component satisfy 0.0 (mass %) $\leq$ a $\leq$ 4.25 (mass %), 0.0 (mass %) $\leq$ b $\leq$ 5.5 (mass %), 4.5 (mass %) $\leq$ c $\leq$ 10.0 (mass %), b $\geq$ a−3, and a+b+c=10.

According to the above composition, the dielectric ceramic composition can be fired at a temperature lower than the melting point of a Ag-based metal and thus a dielectric ceramic composition having high chemical resistance can be produced.

A dielectric ceramic composition according to another aspect of the present invention includes a component represented by composition formula $\{\alpha(xBaO.yNd_2O_3.zTiO_2)+\beta(2MgO.SiO_2)\}$ as a main component; and zinc oxide, boron oxide, and a glass having a softening point of 570° C. or less as minor components with respect to the main component. In the dielectric ceramic composition, x, y, and z that respectively represent molar ratios of BaO, $Nd_2O_3$, and $TiO_2$ satisfy 14 (mol %) $\leq$ x $\leq$ 19 (mol %), 12 (mol %) $\leq$ y $\leq$ 17 (mol %), 65 (mol %) $\leq$ z $\leq$ 71 (mol %), and x+y+z=100; $\alpha$ and $\beta$ that represent volume ratios of subcomponents in the main component satisfy 35 (vol %) $\leq$ $\alpha$ $\leq$ 65 (vol %), 35 (vol %) $\leq$ $\beta$ $\leq$ 65 (vol %), and α+β=100; and, when the minor components are respectively represented by aZnO, bB$_2$O$_3$, and cglass, a, b, and c that represent mass ratios of the respective minor components to the main component satisfy 0.0 (mass %)≤a≤4.75 (mass %), 1.0 (mass %)≤b≤6.5 (mass %), 3.5 (mass %)≤c≤5.0 (mass %), b≥a−3, and a+b+c=10.

According to the above composition, the dielectric ceramic composition can be fired at a temperature lower than the melting point of a Ag-based metal and thus a dielectric ceramic composition having a Q value of 400 or more can be produced.

In the dielectric ceramic composition described above, a, b, and c that represent the mass ratios of the respective minor components to the main component may satisfy 0.0 (mass %)≤a≤4.25 (mass %), 1.0 (mass %)≤b≤5.5 (mass %), 4.5 (mass %)≤c≤5.0 (mass %), b≥a−3, and a+b+c=10.

According to the above composition, the dielectric ceramic composition can be fired at a temperature lower than the melting point of a Ag-based metal and thus a dielectric ceramic composition having high chemical resistance and a Q value of 400 or more can be produced.

DESCRIPTION OF THE PREFERRED EMBODIMENTS

Figure 1:
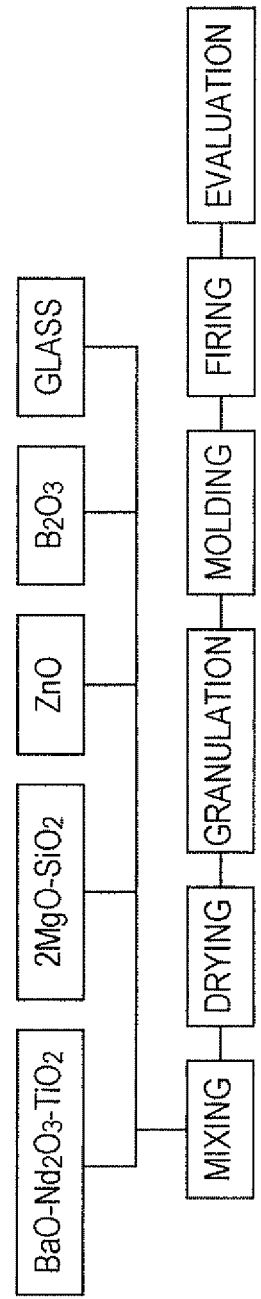
FIG. 1 is a flowchart showing an example of a method for producing a dielectric ceramic composition according to the present embodiment.

A dielectric ceramic composition of the present embodiment includes a main component represented by composition formula {α(xBaO.yNd$_2$O$_3$.zTiO$_2$)+β(2MgO.SiO$_2$)}.

The dielectric ceramic composition of the present embodiment further includes zinc oxide, boron oxide, and a glass having a softening point of 570° C. or less as minor components with respect to the main component.

Main Component

The dielectric ceramic composition of the present embodiment includes a component represented by composition formula {α(xBaO.yNd$_2$O$_3$.zTiO$_2$)+β(2MgO.SiO$_2$)} as a main component, and x, y, and z that respectively represent the molar ratios of BaO, Nd$_2$O$_3$, and TiO$_2$ satisfy 14 (mol %)≤x≤19 (mol %), 12 (mol %)≤y≤17 (mol %), 65 (mol %)≤z≤71 (mol %), and x+y+z=100.

Furthermore, α and β that represent the volume ratios (vol %) of subcomponents in the main component satisfy 35 (vol %)≤α≤65 (vol %), 35 (vol %)≤β≤65 (vol %), and α+β=100.

The content ratio x of BaO is 14 (mol %)≤x≤19 (mol %), preferably 15 (mol %)≤x≤19 (mol %), and more preferably 17 (mol %)≤x≤19 (mol %).

If the content ratio x of BaO is less than 14 mol %, the dielectric loss increases and the Q value tends to decrease, which excessively increases the power loss in the form of a high-frequency device. If the content ratio x of BaO is more than 19 mol %, the low-temperature sintering properties degrade and thus a dielectric ceramic composition sometimes cannot be formed. In addition, the Q value significantly decreases, which excessively increases the power loss in the form of a high-frequency device.

The content ratio y of Nd$_2$O$_3$ is 12 (mol %)≤y≤17 (mol %), preferably 13 (mol %)≤y≤16 (mol %), and more preferably 14 (mol %)≤y≤16 (mol %).

If the content ratio y of Nd$_2$O$_3$ is less than 12 mol %, the dielectric loss increases and the Q value tends to decrease, which excessively increases the power loss in the form of a high-frequency device. If the content ratio y of Nd$_2$O$_3$ is more than 17 mol %, the low temperature sintering properties degrade and thus a dielectric ceramic composition sometimes cannot be formed. In addition, the Q value significantly decreases, which excessively increases the power loss in the form of a high-frequency device.

The content ratio z of TiO$_2$ is 65 (mol %)≤z≤71 (mol %), preferably 65 (mol %)≤z≤69 (mol %), and more preferably 65 (mol %)≤z≤67 (mol %).

If the content ratio z of TiO$_2$ is less than 65 mol %, the dielectric loss increases and the Q value tends to decrease, and furthermore the resonant frequency temperature coefficient τf tends to increase in the negative direction. Therefore, the power loss increases in the form of a high-frequency device and the resonant frequency of the high-frequency device easily fluctuates depending on temperature. If the content ratio z of TiO$_2$ is more than 71 mol %, the low temperature sintering properties degrade and thus a dielectric ceramic composition sometimes cannot be formed.

In the composition formula that represents the main component in the present embodiment, α and β respectively represent the volume ratios of (1) Ba—Nd—Ti composite oxide and (2) Mg—Si composite oxide, which constitute the main component of the dielectric ceramic composition of the present embodiment.

In the composition formula, α and β satisfy 35 (vol %)≤α≤65 (vol %), 35 (vol %)≤β≤65 (vol %), and α+β=100.

The volume ratio α of the xBaO.yNd$_2$O$_3$.zTiO$_2$ subcomponent is preferably 45 (vol %)≤α≤65 (vol %) and more preferably 50 (vol %)≤α≤60 (vol %).

The volume ratio β of the 2MgO.SiO$_2$ subcomponent is preferably 35 (vol %)≤β≤55 (vol %) and more preferably 40 (vol %)≤β≤50 (vol %).

If α is more than 65 and β is less than 35, the relative permittivity ∈r of the dielectric ceramic composition tends to increase and it tends to become difficult to improve the performance of multilayer devices obtained by joining an existing high-permittivity material and the dielectric ceramic composition according to an embodiment of the present invention. Furthermore, if α is more than 65 and β is less than 35, the resonant frequency temperature coefficient τf tends to increase in the positive direction and the resonant frequency of the high-frequency device tends to easily fluctuate depending on temperature. If α is less than 35 and β is more than 65, the resonant frequency temperature coefficient τf of the dielectric ceramic composition tends to increase in the negative direction and the resonant frequency of the high-frequency device tends to easily fluctuate depending on temperature. By setting the volume ratio α of the xBaO.yNd$_2$O$_3$.zTiO$_2$ subcomponent and the volume ratio β of the 2MgO.SiO$_2$ subcomponent within the above-described preferred ranges, these unfavorable tendencies can be suppressed.

The 2MgO.SiO$_2$ included as part of the main component is preferably included in the dielectric ceramic composition in the form of a forsterite crystal to decrease the dielectric loss. Whether or not the forsterite crystal is included in the dielectric ceramic composition can be confirmed with an X-ray diffractometer (XRD).

An $xBaO.yNd_2O_3.zTiO_2$-based compound has a high relative permittivity $\varepsilon r$ of about 55 to 105 whereas $2MgO.SiO_2$ (forsterite) alone has a low relative permittivity $\varepsilon r$ of about 6.8. The dielectric ceramic composition of the present embodiment includes the $xBaO.yNd_2O_3.zTiO_2$-based compound having a high relative permittivity $\varepsilon r$ and the $2MgO.SiO_2$ having a low relative permittivity $\varepsilon r$ as a main component, and thus the relative permittivity $\varepsilon r$ of the dielectric ceramic composition can be suitably decreased.

In the case where a multilayer device is produced by joining a dielectric layer formed of the dielectric ceramic composition of the present embodiment to a dielectric layer formed of a publicly known BaO-rare earth oxide-$TiO_2$-based dielectric ceramic composition (high-permittivity material), the performance of the multilayer device can be improved as the relative permittivity of the dielectric ceramic composition of the present embodiment becomes lower than that of the high-permittivity material. For this reason, the relative permittivity $\varepsilon r$ of the dielectric ceramic composition of the present embodiment is preferably 40 or less, more preferably 35 or less, and further preferably 25 to 35.

The $xBaO.yNd_2O_3.zTiO_2$-based compound often has a positive resonant frequency temperature coefficient $\tau f$ (unit: ppm/K) whereas the $2MgO.SiO_2$ (forsterite) alone has a negative resonant frequency temperature coefficient $\tau f$, which is about −65 (ppm/K). In the present embodiment, the dielectric ceramic composition includes the $xBaO.yNd_2O_3.zTiO_2$-based compound having a positive resonant frequency temperature coefficient $\tau f$ and the $2MgO.SiO_2$ having a negative resonant frequency temperature coefficient $\tau f$, and thus the positive resonant frequency temperature coefficient $\tau f$ and the negative resonant frequency temperature coefficient $\tau f$ cancel each other out. Consequently, the resonant frequency temperature coefficient if of the dielectric ceramic composition can be set to approximately zero. By increasing or decreasing the content of $2MgO.SiO_2$ in the main component, the resonant frequency temperature coefficient $\tau f$ of the dielectric ceramic composition can be adjusted. Note that the temperature coefficient $\tau f$ and the Q value described below are values obtained from a sintered dielectric ceramic composition.

The resonant frequency temperature coefficient $\tau f$ (unit: ppm/K) of the dielectric ceramic composition is calculated using the relationship represented by formula (I) below.

$$\tau f = [fT - fref/fref(T - Tref)] \times 10^6 \text{ (ppm/K)} \quad (1)$$

In the formula (1), fT represents the resonant frequency at a temperature T and fref represents the resonant frequency at a reference temperature Tref. The magnitude of the absolute value of $\tau f$ means the magnitude of the variation in the resonant frequency of the dielectric ceramic composition in response to temperature change. In high-frequency devices such as capacitors and dielectric filters, since the variation in the resonant frequency in response to temperature change needs to be small, the absolute value of $\tau f$ the dielectric ceramic composition is required to be low.

The resonant frequency temperature coefficient $\tau f$ of the dielectric ceramic composition of the present embodiment is preferably −40 (ppm/K) to +40 (ppm/K), more preferably −30 (ppm/K) to +30 (ppm/K), and further preferably −20 (ppm/K) to +20 (ppm/K). In the case where the dielectric ceramic composition is applied to a dielectric resonator, by setting the resonant frequency temperature coefficient $\tau f$ within the above-described preferred range, the variation in the resonant frequency of the dielectric resonator in response to temperature change can be reduced and the performance of the dielectric resonator can be improved.

The $xBaO.yNd_2O_3.zTiO_2$-based compound has a Q·f value of about 2000 to 8000 GHz whereas the $2MgO.SiO_2$ (forsterite) alone has a Q·f value of about 200000 GHz, which means that the dielectric loss of the $2MgO.SiO_2$ is lower than that of the $xBaO.yNd_2O_3.zTiO_2$-based compound. In the present embodiment, the dielectric ceramic composition includes, as part of the main component, a forsterite having a dielectric loss lower than that of the $xBaO.yNd_2O_3.zTiO_2$-based compound, and thus a dielectric ceramic composition having a low dielectric loss can be produced.

The "Q value" of the dielectric ceramic composition represents the magnitude of dielectric loss and is the inverse of tan δ (Q=1/tan δ), where δ represents a loss angle that is a difference between a real voltage-current phase difference and an ideal voltage-current phase difference (90 degrees).

When an alternating current is applied to an ideal dielectric ceramic composition, the voltage and current have a phase difference of 90 degrees. However, when the alternating current has a high frequency, electric polarization or orientation of polar molecules of the dielectric ceramic composition cannot follow the change in the high-frequency electric field, or the electric flux density has a phase lag (phase difference) with respect to the electric field due to the conduction of electrons or ions. Thus, the real voltage-current phase difference results in a value other than 90 degrees. A phenomenon in which part of high-frequency energy is dissipated in the form of heat due to such a phase difference is called "dielectric loss". The Q value increases as the dielectric loss decreases and the Q value decreases as the dielectric loss increases. The dielectric loss means the power loss in high-frequency devices. Since the dielectric loss is required to be low to improve the performance of high-frequency devices, a dielectric ceramic composition having a high Q value is demanded.

In view of the foregoing, the Q value of the dielectric ceramic composition of the present embodiment is preferably 400 or more.

Minor Components

First Embodiment

The dielectric ceramic composition of the present embodiment includes zinc oxide, boron oxide, and a glass having a softening point of 570° C. or less as minor components with respect to the main component ($xBaO.yNd_2O_3.zTiO_2$-based compound and $2MgO.SiO_2$). When the minor components are respectively represented by aZnO, $bB_2O_3$, and cglass, a, b, and c that represent the mass ratios of the respective minor components to the main component satisfy 0.0 (mass %)≤a≤4.25 (mass %), 0.0 (mass %)≤b≤5.5 (mass %), 4.5 (mass %)≤c≤10.0 (mass %), b≥a−3, and a+b+c=10.

When the dielectric ceramic composition includes the above-described minor components, the sintering temperature of the dielectric ceramic composition decreases. Therefore, the dielectric ceramic composition and a Ag-based metal can be simultaneously fired at a temperature lower than the melting point of an internal conductor made of the Ag-based metal.

The content a (unit: mass %) of zinc oxide, which is one of the minor components, the content a being a ZnO-equivalent mass ratio of zinc oxide relative to 100 mass % of the main component, is 0.0≤a≤4.25, preferably 0.0≤a≤4.0, and more preferably 0.5≤a≤3.5.

If a is more than 4.25, the low-temperature sintering effect (effect that enables the sintering of dielectric ceramic compositions at a lower temperature) tends to become insufficient. By setting the content a of zinc oxide within the above-described preferred range, the tendency can be suppressed. A specific example of zinc oxide is ZnO.

The content b (unit: mass %) of boron oxide, which is one of the minor components, the content b being a $B_2O_3$-equivalent mass ratio of boron oxide relative to 100 mass % of the main component, is $0.0 \leq b \leq 5.5$, preferably $0.5 \leq b \leq 5.0$, and more preferably $1.0 \leq b \leq 4.0$.

If b is more than 5.0, the chemical resistance (capability of preventing elution caused by an acid, an alkali, or the like) tends to become insufficient. By setting the content b of boron oxide within the above-described preferred range, the tendency can be suppressed. A specific example of boron oxide is $B_2O_3$.

The content c (unit: mass %) of a glass having a softening point of 570° C. or less, which is one of the minor components, the content c being a mass ratio of the glass relative to 100 mass % of the main component, is $4.5 \leq c \leq 10.0$, preferably $4.5 \leq c \leq 7.5$, and more preferably $4.5 \leq c \leq 5.0$.

If c is less than 4.5, the chemical resistance tends to become insufficient. By setting the content c of a glass having a low softening point within the above-described preferred range, the tendency can be suppressed. If c is more than 10.0, the Q value tends to become insufficient.

When $b < a - 3$ or when $a + b + c > 10$, the low-temperature sintering effect tends to become insufficient.

By adding a glass having a low softening point and high chemical resistance, the firing temperature of dielectric ceramic compositions can be considerably decreased and the chemical resistance of dielectric ceramic compositions can be improved. The dielectric ceramic composition of the present embodiment can have a sufficient low-temperature sintering effect.

Minor Components

Second Embodiment

A sample is produced in the same manner as in the first embodiment except that the minor components are changed to be as follows.

Zinc oxide, boron oxide, and a glass having a softening point of 570° C. or less are included as the minor components. When the minor components are respectively represented by aZnO, $bB_2O_3$, and cglass, a, b, and c that represent the mass ratios of the respective minor components to the main component satisfy 0.0 (mass %) $\leq \alpha \leq 4.75$ (mass %), 1.0 (mass %) $\leq b \leq 6.5$ (mass %), 3.5 (mass %) $\leq c \leq 5.0$ (mass %), $b \geq a - 3$, and $a+b+c=10$.

The content a (unit; mass %) of zinc oxide, which is one of the minor components, the content a being a ZnO-equivalent mass ratio of zinc oxide relative to 100 mass % of the main component, is $0.5 \leq a \leq 4.75$, preferably $0.0 \leq a \leq 4.25$, and more preferably $0.5 \leq a \leq 3.5$.

If a is more than 4.75, the low-temperature sintering effect (effect that enables the sintering of dielectric ceramic compositions at a lower temperature) tends to become insufficient. By setting the content a of zinc oxide within the above-described preferred range, the tendency can be suppressed.

The content b (unit: mass %) of boron oxide, which is one of the minor components, the content b being a $B_2O_3$-equivalent mass ratio of boron oxide relative to 100 mass % of the main component, is $1.0 \leq b \leq 6.5$, preferably $1.0 \leq b \leq 6.0$, and more preferably $1.5 \leq b \leq 5.5$.

If $b > 6.5$ or $b < 1.0$, the Q value tends to become insufficient. By setting the content b of boron oxide within the above-described preferred range, the tendency can be suppressed. A specific example of boron oxide is $B_2O_3$.

The content c (unit: mass %) of a glass having a softening point of 570° C. or less, which is one of the minor components, the content c being a mass ratio of the glass relative to 100 mass % of the main component, is $3.5 \leq c \leq 5.0$, preferably $4.0 \leq c \leq 5.0$, and more preferably $4.5 \leq c \leq 5.0$.

If $c < 3.5$ or $c > 5.0$, the Q value tends to become insufficient. By setting the content c of a glass having a low softening point within the above-described preferred range, the tendency can be suppressed.

When $b < a - 3$ or when $a + b + c > 10$, the low-temperature sintering effect tends to become insufficient.

Minor Components

Third Embodiment

A sample is produced in the same manner as in the first embodiment except that the minor components are changed as follows.

Zinc oxide, boron oxide, and a glass having a softening point of 570° C. or less are included as the minor components. When the minor components are respectively represented by aZnO, $bB_2O_3$, and cglass, a, b, and c that represent the mass ratios of the respective minor components to the main component satisfy 0.0 (mass %) $\leq a \leq 4.25$ (mass %), 1.0 (mass %) $\leq b \leq 5.5$ (mass %), 4.5 (mass %) $\leq c \leq 5.0$ (mass %), $b \geq a-3$, and $a+b+c=10$.

The content a (unit: mass %) of zinc oxide, which is one of the minor components, the content a being a ZnO-equivalent mass ratio of zinc oxide relative to 100 mass % of the main component, is $0.0 \leq a \leq 4.25$, preferably $0.0 \leq a \leq 4.0$, and more preferably $0.5 \leq a \leq 3.5$.

If a is more than 4.25, the low-temperature sintering effect (effect that enables the sintering of dielectric ceramic compositions at a lower temperature) tends to become insufficient. By setting the content a of zinc oxide within the above-described preferred range, the tendency can be suppressed.

The content b (unit: mass %) of boron oxide, which is one of the minor components, the content b being a $B_2O_3$-equivalent mass ratio of boron oxide relative to 100 mass % of the main component, is $1.0 \leq b \leq 5.5$, preferably $1.0 \leq b \leq 5.0$, and more preferably $1.5 \leq b \leq 4.0$.

If $b > 5.5$ or $b < 1.0$, the Q value tends to become insufficient. By setting the content b of boron oxide within the above-described preferred range, the tendency can be suppressed. A specific example of boron oxide is $B_2O_3$.

The content c (unit: mass %) of a glass having a softening point of 570° C. or less, which is one of the minor components, the content c being a mass ratio of the glass relative to 100 mass % of the main component, is $4.5 \leq c \leq 5.0$, preferably $4.6 \leq c \leq 4.9$, and more preferably $4.75 \leq c \leq 4.85$.

If $c < 4.5$ or $c > 5.0$, the Q value tends to become insufficient. By setting the content c of the glass having a softening point of 570° C. or less within the above-described preferred range, the tendency can be suppressed.

When $b < a-3$ or when $a+b+c > 10$, the low-temperature sintering effect tends to become insufficient.

The type of glass that can be used in the present embodiment is not particularly limited as long as the softening point is 570° C. or less in view of low-temperature sintering, and a publicly known glass can be used as the glass. Such a glass composition can be obtained by mixing raw materials such as a network-forming oxide component, a metal oxide, and a modifying oxide component.

The network-forming oxide component may be, for example, $SiO_2$ or $B_2O_3$ and is preferably $SiO_2$ in terms of chemical resistance. The metal oxide may be at least one selected from $Li_2O$, $Na_2O$, $K_2O$, $ZrO_2$, $Al_2O_3$, ZnO, CuO, NiO, CoO, MnO, $Cr_2O_3$, $V_2O_5$, MgO, $Nb_2O_5$, and $Ta_2O_5$, and is preferably an alkali metal oxide and more preferably $Li_2O$ to effectively suppress the segregation of Ag and sinter the dielectric ceramic composition at a lower temperature. The modifying oxide component may be an alkaline-earth oxide such as at least one selected from CaO, SrO, and BaO to reinforce the chemical resistance degraded by addition of the metal oxide.

The softening point of the glass according to the present embodiment is determined by differential thermal analysis (DTA).

Since the main component of the dielectric ceramic composition in the present embodiment includes an $xBaO.yNd_2O_3.zTiO_2$-based compound, the dielectric ceramic composition is similar to a publicly known BaO-rare earth oxide-$TiO_2$-based dielectric ceramic composition (high-permittivity material) in terms of material quality. Therefore, the contraction behavior and linear expansion coefficient of the dielectric ceramic composition according to the present embodiment during firing are the same as those of the high-permittivity material. Accordingly, by joining the dielectric ceramic composition of the present embodiment and the high-permittivity material and performing firing, a high-performance multilayer device in which defects are not easily formed on the joining face and which has a good appearance can be produced.

Production Method

An example of a method for producing the dielectric ceramic composition of the present embodiment will now be described. FIG. 1 is a flowchart showing an example of a method for producing the dielectric ceramic composition of the present embodiment.

The raw materials of the main component and minor components of the dielectric ceramic composition are, for example, an $xBaO.yNd_2O_3.zTiO_2$-based compound, $2MgO.SiO_2$, zinc oxide, boron oxide, and a compound that forms into the foregoing oxide by firing (heat treatment such as the calcination described below).

Examples of the compound that forms into the foregoing oxide by firing include carbonates, nitrates, oxalates, hydroxides, sulfides, and organic metal compounds.

Main Component

Barium carbonate, neodymium hydroxide, and titanium oxide, which are raw materials of the main component, are weighed in predetermined amounts and mixed with one another. Each of the raw materials is weighed so that the molar ratios x, y, and z in the composition formula $xBaO.yNd_2O_3.zTiO_2$ satisfy the above-described preferred ranges.

Barium carbonate, neodymium hydroxide, and titanium oxide can be mixed in a dry or wet process. For example, the mixing can be performed with a ball mill using pure water, ethanol, or the like. The mixing time may be, for example, about 4 to 24 hours.

The mixture of barium carbonate, neodymium hydroxide, and titanium oxide is dried at preferably 100° C. to 200° C. and more preferably 120° C. to 140° C. for about 12 to 36 hours, and then calcined. Through this calcination, an $xBaO.yNd_2O_3.zTiO_2$-based compound is synthesized. The calcination temperature is preferably 1100° C. to 1500° C. and more preferably 1100° C. to 1350° C. The calcination is preferably performed for about 1 to 24 hours.

The synthesized $xBaO.yNd_2O_3.zTiO_2$-based compound is pulverized into powder and then dried to prepare an $xBaO.yNd_2O_3.zTiO_2$-based compound powder. The pulverization can be performed in a dry or wet process. For example, the pulverization can be performed with a ball mill using pure water, ethanol, or the like. The pulverization time may be about 4 to 24 hours. The drying temperature of the powder is preferably 100° C. to 200° C. and more preferably 120° C. to 140° C. The drying time of the powder may be about 12 to 36 hours.

Next, magnesium oxide and silicon oxide, which are raw materials of another subcomponent $2MgO.SiO_2$ (forsterite) in the main component, are weighed in predetermined amounts, mixed with each other, and calcined. The magnesium oxide and silicon oxide can be mixed in a dry or wet process. For example, the mixing can be performed with a ball mill using pure water, ethanol, or the like. The mixing time may be about 4 to 24 hours.

The mixture of magnesium oxide and silicon oxide is dried at preferably 100° C. to 200° C. and more preferably 120° C. to 140° C. for about 12 to 36 hours, and then calcined. Through this calcination, $2MgO.SiO_2$ (forsterite) is synthesized. The calcination temperature is preferably 1100° C. to 1500° C. and more preferably 1100° C. to 1350° C. The calcination is preferably performed for about 1 to 24 hours.

The synthesized forsterite crystal is pulverized into powder and then dried to prepare a forsterite crystal powder. The pulverization can be performed in a dry or wet process. For example, the pulverization can be performed with a ball mill using pure water, ethanol, or the like. The pulverization time may be about 4 to 24 hours. The drying temperature of the powder is preferably 100° C. to 200° C. and more preferably 120° C. to 140° C. The drying time of the powder may be about 12 to 36 hours.

Alternatively, a commercially available forsterite may be used without synthesizing a forsterite crystal from a magnesium-containing raw material and a silicon-containing raw material as described above. For example, the commercially available forsterite can be pulverized and dried by the above-described method to prepare a forsterite powder.

The prepared $xBaO.yNd_2O_3.zTiO_2$-based compound powder and $2MgO.SiO_2$ (forsterite crystal) powder are mixed with each other at a volume ratio of $\alpha:\beta$ to prepare the main component of the dielectric ceramic composition. The $xBaO.yNd_2O_3.zTiO_2$-based compound and the $2MgO.SiO_2$ are mixed with each other, whereby the relative permittivity $\in r$ of the dielectric ceramic composition can be decreased, the resonant frequency temperature coefficient $\tau f$ can be set to approximately zero, and the dielectric loss can be decreased compared with the case where the $xBaO.yNd_2O_3.zTiO_2$-based compound alone is used as the main component.

To improve the addition effect of the $2MgO.SiO_2$, it is preferable to decrease the amounts of unreacted raw material components. Specifically, when the mixture of magnesium oxide and silicon oxide is prepared, the magnesium oxide and silicon oxide are preferably mixed with each other so that the number of moles of magnesium is twice the number of moles of silicon.

Minor Components

Next, the prepared powder of the main component of the dielectric ceramic composition and zinc oxide, boron oxide, and a glass having a softening point of 570° C. or less, which are raw materials of minor components of the dielectric ceramic composition, are weighed in predetermined amounts and then mixed with one another to prepare a raw material mixed powder.

Each of the raw materials of the minor components is weighed so that the above-described mass ratio of each of the minor components to the main component is satisfied in the finished dielectric ceramic composition. The mixing can be performed in a dry or wet process. For example, the mixing can be performed with a ball mill using pure water, ethanol, or the like. The mixing time may be about 4 to 24 hours.

The raw material mixed powder is dried at preferably 100° C. to 200° C. and more preferably 120° C. to 140° C. for about 12 to 36 hours.

The raw material mixed powder is calcined at a temperature equal to or lower than the firing temperature (800° C. to 1000° C.) described below, for example, 700° C. to 800° C. for about 1 to 10 hours. The calcined raw material mixed powder is pulverized into powder and then dried. By calcining the raw material mixed powder at a temperature equal to or lower than the firing temperature, the fusion of the forsterite in the raw material mixed powder can be suppressed. As a result, the dielectric ceramic composition can contain forsterite in the form of a crystal.

As described above, the calcination and pulverization are performed twice in total before the raw materials are mixed with one another and after the raw material mixed powder is prepared by mixing the raw materials. Thus, the main component and minor components of the dielectric ceramic composition can be uniformly mixed with each other and a dielectric ceramic composition having uniform material quality can be produced.

The addition of the glass is not necessarily performed during the mixing before calcination, and may be performed during the pulverization after calcination.

The pulverization can be performed in a dry or wet process. For example, the pulverization can be performed with a ball mill using pure water, ethanol, or the like. The pulverization time may be, for example, about 4 to 24 hours. The drying temperature of the pulverized powder is preferably 100° C. to 200° C. and more preferably 120° C. to 140° C. The drying time of the powder may be about 12 to 36 hours.

An organic binder such as a polyvinyl alcohol binder, an acrylic binder, or an ethylcellulose binder is mixed with the powder prepared as described above. The resultant mixture is then molded into a desired shape. The molded product is sintered by firing. The molding method can be suitably selected in accordance with the desired shape. Examples of the molding method include wet molding methods such as a sheet method and a printing method and dry molding methods such as press molding. The firing is preferably performed in an oxygen atmosphere such as air. The firing temperature is preferably equal to or lower than the melting point of a conductor, such as Ag or an alloy mainly composed of Ag, used as an internal electrode. Specifically, the firing temperature is preferably 800° C. to 1000° C., more preferably 850° C. to 920° C., and further preferably 860° C. to 900° C.

The dielectric ceramic composition of the present embodiment can be suitably used as, for example, a raw material for a multilayer device, which is one type of high-frequency device. A multilayer device is produced from a multilayer ceramic substrate including a plurality of ceramic layers in which dielectric devices such as capacitors and inductors are integrally formed (integrally embedded). The multilayer ceramic substrate can be produced by forming through holes in green sheets that are formed of dielectric ceramic compositions having different dielectric properties, laminating the green sheets, and then simultaneously firing the green sheets.

In the production of the multilayer device, for example, an organic binder such as an acrylic binder or an ethylcellulose binder is mixed with the dielectric ceramic composition of the present embodiment, and then the resultant mixture is molded into a sheet-like shape to obtain a green sheet. An example of the molding method of the green sheet is a wet molding method such as a sheet method.

Subsequently, a plurality of the obtained green sheets and a plurality of green sheets having dielectric properties different from those of the obtained green sheets are alternately laminated with a Ag-based metal for a conductor material disposed therebetween, the conductor material serving as an internal electrode. The laminated body is cut into green chips having a desired size. Each of the green chips is subjected to a debinding treatment and then fired to obtain a sintered body. The firing is preferably performed, for example, in an oxygen atmosphere such as air. The firing temperature is preferably equal to or lower than the melting point of the Ag-based metal used for an internal conductor. Specifically, the firing temperature is preferably 800° C. to 1000° C. and more preferably 870° C. to 940° C. External electrodes and the like are formed on the obtained sintered body, whereby a multilayer device including internal electrodes composed of a Ag-based metal can be produced.

EXAMPLES

The present invention will now be further described in detail based on Examples. However, the present embodiment is not limited to Examples.

Examples 1 to 24

Dielectric ceramic compositions of Examples 1 to 24 and Comparative Examples 1 to 14 were produced by changing the contents of the main component and minor components of the dielectric ceramic composition as shown in Table. A measurement sample was prepared using each of the produced dielectric ceramic compositions. The density, elution amount with acid, and Q value of the measurement sample were measured to respectively evaluate the low-temperature sintering properties, chemical resistance, and dielectric properties. Table collectively shows the results. The production method of the dielectric ceramic compositions, the preparation method of the measurement samples, and the evaluation method were the same as those of Example 1 described below as an example, except that the conditions listed in Table were changed. In EXAMPLES, the following glass having a low softening point was used.

Glass: $SiO_2$—$BaO$—$CaO$—$Li_2O$-based crystalline glass (referred to as "glass").

Example 1

A dielectric ceramic composition including a main component represented by composition formula $\{\alpha(xBaO \cdot yNd_2O_3 \cdot zTiO_2)+\beta(2MgO \cdot SiO_2)\}$, where $\alpha=55$ (vol %), $\beta=45$ (vol %), $x=18.5$ (mol %), $y=15.4$ (mol %), and $z=66.1$ (mol %), and minor components constituted by 4.0 mass % of ZnO, 1.5 mass % of $B_2O_3$, and 4.5 mass % of glass relative to 100 mass % of the main component was produced through the process described below.

First, $BaCO_3$, $Nd(OH)_3$, and $TiO_2$, which were raw materials of the main component, were weighed so that the molar ratios x, y, and z in the $xBaO \cdot yNd_2O_3 \cdot zTiO_2$ obtained after the raw materials were calcined would have the above-described values. Pure water was added to the weighed raw materials to prepare a slurry. The slurry was mixed in a wet process using a ball mill and then dried at 120° C. to obtain a powder. The powder was calcined in the air at 1200° C. for four hours to obtain an $xBaO \cdot yNd_2O_3 \cdot zTiO_2$-based compound represented by composition formula $xBaO \cdot yNd_2O_3 \cdot zTiO_2$ (x=18.5 (mol %), y=15.4 (mol %), and z=66.1 (mol %)). Pure water was added to the $xBaO \cdot yNd_2O_3 \cdot zTiO_2$-based compound to prepare a slurry. The slurry was pulverized with a ball mill and then dried at 120° C. to produce an $xBaO \cdot yNd_2O_3 \cdot zTiO_2$-based compound powder.

Next, MgO and $SiO_2$, which were other raw materials of the main component, were weighed so that the number of moles of magnesium atoms was twice the number of moles of silicon atoms. Pure water was added to the weighed raw materials to prepare a slurry. The slurry was mixed in a wet process using a ball mill and then dried at 120° C. to obtain a powder. The powder was calcined in the air at 1200° C. for three hours to obtain a forsterite crystal ($2MgO \cdot SiO_2$). Pure water was added to the forsterite crystal to prepare a slurry. The slurry was pulverized with a ball mill and then dried at 120° C. to produce a forsterite crystal powder.

Subsequently, the produced $xBaO \cdot yNd_2O_3 \cdot zTiO_2$-based compound powder and the produced forsterite crystal powder were mixed with each other at a volume ratio of 55:45 to prepare a mixture. ZnO, $B_2O_3$, and glass, which were raw materials of the minor components of the dielectric ceramic composition, were added to the mixture. Then, ethanol was added thereto to prepare a slurry. The slurry was pulverized in a wet process using a ball mill and then dried at 100° C. to obtain a powder of the dielectric ceramic composition of Example 1.

The amounts of the ZnO, $B_2O_3$, and glass added to the mixture of the $xBaO \cdot yNd_2O_3 \cdot zTiO_2$-based compound powder and the forsterite crystal powder were adjusted so that the finished dielectric ceramic composition would include 4.0 mass % of ZnO, 1.5 mass % of $B_2O_3$, and 4.5 mass % of glass relative to 100 mass % of the main component.

An acrylic resin binder was added to the powder of the dielectric ceramic composition of Example 1 to perform granulation. A sample for measuring the density and elution amount was prepared by hand pressing 1.75 g of the granulated powder of the dielectric ceramic composition using a φ12 mm die at 12 kN and firing the granulated powder at a firing temperature of 900° C. for two hours.

Measurement of Density

Figure 2:
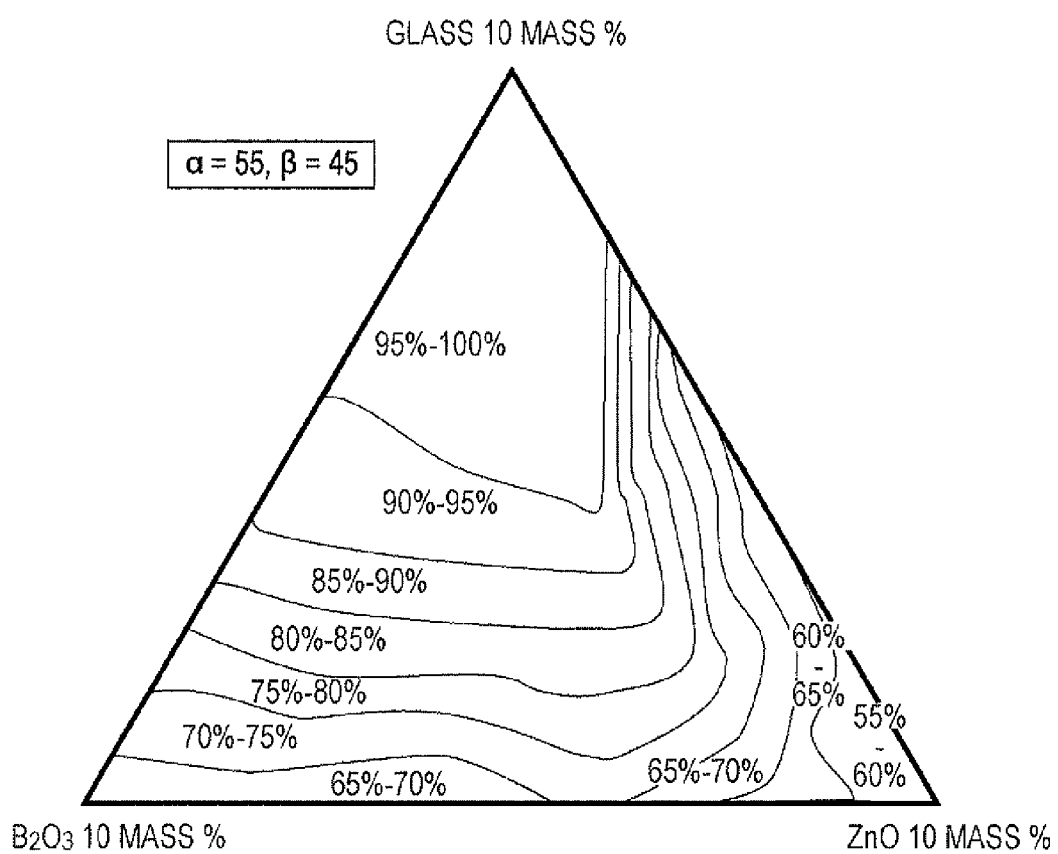
FIG. 2 shows a relationship between the ratios of minor components and the density in Examples 1 to 18 and Comparative Examples 1 to 8.

The density of the measurement sample in Example 1 was evaluated by using the ratio of the density calculated from the size and weight of the measurement sample after sintering to the theoretical density calculated from the composition. Table and FIG. 2 show the results.

Measurement of Elution Amount

Figure 3:
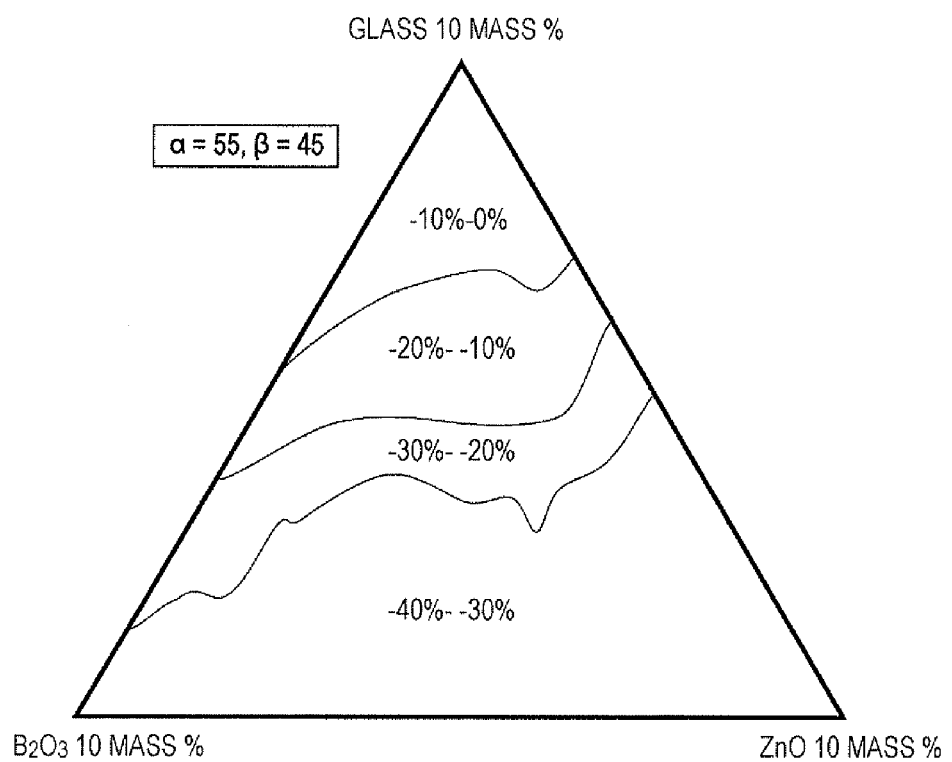
FIG. 3 shows a relationship between the ratios of minor components and the chemical resistance in Examples 1 to 18 and Comparative Examples 1 to 8.

The elution amount of the measurement sample in Example 1 was obtained by immersing the measurement sample in a 10 vol % aqueous sulfuric acid solution for two hours and measuring the change in weight between before and after the immersion. The ratio of the decreased weight after the immersion to the weight of the minor components added was defined as the elution amount. Table and FIG. 3 show the results.

Measurement of Dielectric Properties

Figure 4:
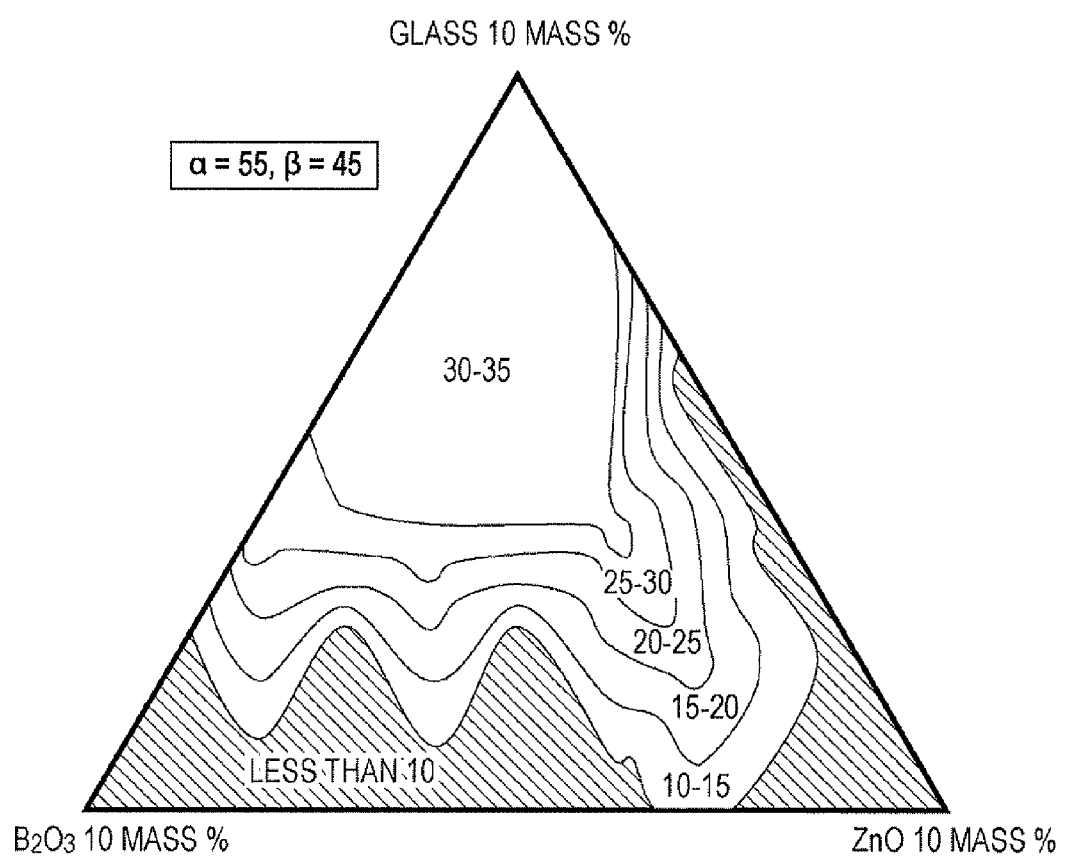
FIG. 4 shows a relationship between the ratios of minor components and the relative permittivity ∈r in Examples 1 to 18 and Comparative Examples 1 to 8.
Figure 5:
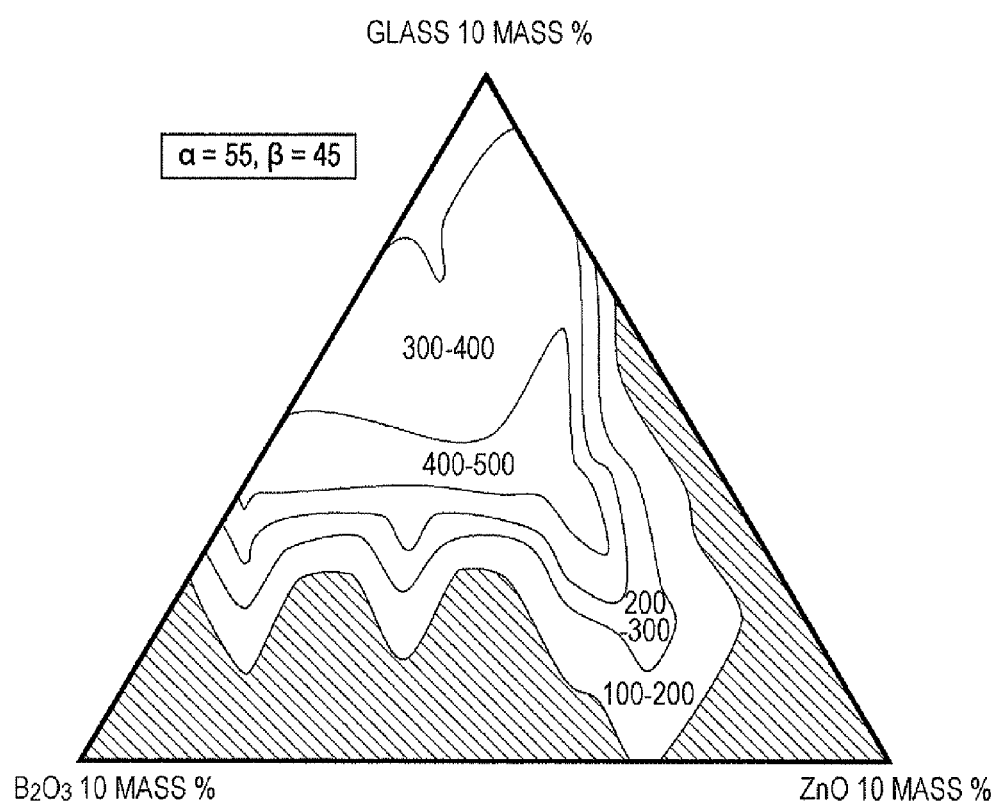
FIG. 5 shows a relationship between the ratios of minor components and the Q value in Examples 1 to 18 and Comparative Examples 1 to 8.

The Q value and the relative permittivity $\in r$ that represent the dielectric properties of the measurement sample in Example 1 were measured by a method called "both end short-circuit type dielectric resonator method". The measurement frequency was in the range of 5 GHz to 10 GHz. Table collectively shows the results. FIG. 4 shows the measurement result of the relative permittivity $\in r$ and FIG. 5 shows the measurement result of the Q value.

TABLE

| | | Main component | | | | Minor component | | | Low-temperature sintering properties | Chemical resistance | Dielectric properties | |
|---|---|---|---|---|---|---|---|---|---|---|---|---|
| | | BaNdTiO | 2MgO•SiO$_2$ | BaO x mol | Nd$_2$O$_3$ y mol | TiO$_2$ z mol | ZnO a mass | B$_2$O$_3$ b mass | Glass c mass | | | | |
| | | α vol % | β vol % | % | % | % | % | % | % | Density ratio % | Elution amount % | ∈r | Q |
| Example | 1 | 55 | 45 | 18.5 | 15.4 | 66.1 | 4.0 | 1.5 | 4.5 | 98.7 | −10.3 | 36.4 | 567 |
| | 2 | | | | | | 4.0 | 1.0 | 5.0 | 94.1 | −9.2 | 32.2 | 440 |
| | 3 | | | | | | 0.67 | 4.67 | 4.67 | 96.7 | −10.5 | 35.6 | 482 |
| | 4 | | | | | | 0.5 | 4.5 | 5.0 | 96.5 | −9.9 | 34.2 | 440 |
| | 5 | | | | | | 0.0 | 5.0 | 5.0 | 92.0 | −9.6 | 30.3 | 402 |
| | 6 | | | | | | 0.5 | 0.5 | 9.0 | 97.5 | −2.1 | 30.5 | 283 |
| | 7 | | | | | | 0.5 | 1.0 | 8.5 | 96.8 | −4.6 | 30.2 | 302 |
| | 8 | | | | | | 0.5 | 2.0 | 7.5 | 98.0 | −8.7 | 33.2 | 306 |
| | 9 | | | | | | 2.0 | 2.0 | 6.0 | 97.7 | −14.8 | 33.3 | 317 |
| | 10 | | | | | | 2.0 | 0.0 | 8.0 | 96.5 | −1.0 | 32.1 | 343 |
| | 11 | | | | | | 3.0 | 0.0 | 7.0 | 90.2 | −8.9 | 30.9 | 308 |
| | 12 | | | | | | 3.5 | 0.5 | 6.0 | 91.9 | −9.0 | 30.3 | 365 |
| | 13 | | | | | | 0.0 | 4.0 | 6.0 | 96.0 | −9.0 | 31.4 | 355 |
| | 14 | | | | | | 0.0 | 2.0 | 8.0 | 98.3 | −1.0 | 31.8 | 283 |
| | 15 | | | | | | 0.0 | 0.0 | 10.0 | 97.5 | −1.9 | 29.8 | 275 |
| | 16 | 55 | 45 | 18.5 | 15.4 | 66.1 | 4.75 | 1.75 | 3.5 | 90.3 | −15.6 | 34.2 | 487 |
| | 17 | | | | | | 0.0 | 6.5 | 3.5 | 91.2 | −16.8 | 27.8 | 402 |
| | 18 | | | | | | 2.0 | 3.5 | 4.5 | 95.9 | −14.4 | 33.9 | 408 |
| Comparative Example | 1 | 55 | 45 | 18.5 | 15.4 | 66.1 | 4.0 | 0.0 | 6.0 | 66.4 | −20.2 | *1 | *1 |
| | 2 | | | | | | 5.5 | 0.0 | 4.5 | 57.7 | −38.5 | *1 | *1 |
| | 3 | | | | | | 0.0 | 8.0 | 2.0 | 78.3 | −28.0 | *1 | *1 |
| | 4 | | | | | | 6.0 | 2.0 | 2.0 | 81.2 | −45.3 | 22.6 | 292 |
| | 5 | | | | | | 2.0 | 6.0 | 2.0 | 82.6 | −37.9 | *1 | *1 |
| | 6 | | | | | | 4.0 | 4.0 | 2.0 | 83.6 | −37.7 | *1 | *1 |
| | 7 | | | | | | 7.5 | 0.5 | 2.0 | 61.6 | −29.1 | *1 | *1 |
| | 8 | | | | | | 0.5 | 7.5 | 2.0 | 88.3 | −16.0 | 29.2 | 348 |
| Example | 19 | 35 | 65 | 18.5 | 15.4 | 66.1 | 4.0 | 1.5 | 4.5 | 96.8 | −8.0 | 33.8 | 454 |
| | 20 | 65 | 35 | | | | 4.0 | 1.5 | 4.5 | 97.6 | −9.5 | 36.2 | 408 |

TABLE-continued

| | | Main component | | BaO x mol % | Nd$_2$O$_3$ y mol % | TiO$_2$ z mol % | Minor component | | | Low-temperature sintering properties | Chemical resistance | Dielectric properties | |
| --- | --- | --- | --- | --- | --- | --- | --- | --- | --- | --- | --- | --- | --- |
| | | BaNdTiO α vol % | 2MgO·SiO$_2$ β vol % | | | | ZnO a mass % | B$_2$O$_3$ b mass % | Glass c mass % | Density ratio % | Elution amount % | εr | Q |
| | 21 | 55 | 45 | 14.0 | 16.3 | 69.8 | 4.0 | 1.5 | 4.5 | 97.2 | −7.8 | 36.5 | 412 |
| | 22 | | | 19.0 | 12.0 | 69.0 | 4.0 | 1.5 | 4.5 | 97.6 | −9.9 | 36.3 | 423 |
| | 23 | | | 18.0 | 17.0 | 65.0 | 4.0 | 1.5 | 4.5 | 97.3 | −10.0 | 33.4 | 421 |
| | 24 | | | 15.8 | 13.2 | 71.0 | 4.0 | 1.5 | 4.5 | 97.5 | −8.2 | 36.3 | 407 |
| Comparative Example | 9 | 30 | 70 | 18.5 | 15.4 | 66.1 | 4.0 | 1.5 | 4.5 | 96.8 | −15.4 | 30.2 | 355 |
| | 10 | 70 | 30 | | | | 4.0 | 1.5 | 4.5 | 97.2 | −15.3 | 36.8 | 301 |
| | 11 | 55 | 45 | 12.0 | 17.0 | 71.0 | 4.0 | 1.5 | 4.5 | 96.5 | −15.8 | 32.0 | 355 |
| | 12 | | | 20.0 | 15.0 | 65.0 | 4.0 | 1.5 | 4.5 | 96.7 | −15.4 | 38.0 | 308 |
| | 13 | | | 17.0 | 10.0 | 73.0 | 4.0 | 1.5 | 4.5 | 96.2 | −15.6 | 34.0 | 367 |
| | 14 | | | 17.0 | 19.0 | 64.0 | 4.0 | 1.5 | 4.5 | 96.3 | −16.2 | 30.0 | 387 |

*1: below the lower limit of measurement

According to Table, in Examples 1 to 24, the density ratio was 90% or more, that is, sintering was performed by firing at 900° C. In Examples 1 to 7, the elution amount was less than 15%. In Examples 1 to 5 and 16 to 24, the Q value was 400 or more. On the other hand, in Comparative Examples 1 to 14, the elution amount was 15% or more and the Q value that indicates dielectric properties was 300 or less or below the lower limit of measurement.

INDUSTRIAL APPLICABILITY

The dielectric ceramic composition according to an embodiment of the present invention can be used as various electronic components in various fields.

What is claimed is:

1. A dielectric ceramic composition comprising:
a component represented by composition formula $\{\alpha(xBaO \cdot yNd_2O_3 \cdot zTiO_2) + \beta(2MgO \cdot SiO_2)\}$ as a main component; and
zinc oxide, boron oxide, and a glass having a softening point of 570° C. or less as minor components with respect to the main component,
wherein x, y, and z that respectively represent molar ratios of BaO, Nd$_2$O$_3$, and TiO$_2$ satisfy 14 (mol %) ≤ x ≤ 19 (mol %), 12 (mol %) ≤ y ≤ 17 (mol %), 65 (mol %) ≤ z ≤ 71 (mol %), and x+y+z=100;

α and β that represent volume ratios of subcomponents in the main component satisfy 35 (vol %) ≤ α ≤ 65 (vol %), 35 (vol %) ≤ β ≤ 65 (vol %), and α+β=100; and when the minor components are respectively represented by aZnO, bB$_2$O$_3$, and cglass, a, b, and c that represent mass ratios of the respective minor components to the main component satisfy 0.0 (mass %) ≤ a ≤ 4.25 (mass %), 0.0 (mass %) ≤ b ≤ 5.5 (mass %), 4.5 (mass %) ≤ c ≤ 10.0 (mass %), b ≥ a−3, and a+b+c=10.

2. A dielectric ceramic composition comprising:
a component represented by composition formula $\{\alpha(xBaO \cdot yNd_2O_3 \cdot zTiO_2) + \beta(2MgO \cdot SiO_2)\}$ as a main component; and
zinc oxide, boron oxide, and a glass having a softening point of 570° C. or less as minor components with respect to the main component,
wherein x, y, and z that respectively represent molar ratios of BaO, Nd$_2$O$_3$, and TiO$_2$ satisfy 14 (mol %) ≤ x ≤ 19 (mol %), 12 (mol %) ≤ y ≤ 17 (mol %), 65 (mol %) ≤ z ≤ 71 (mol %), and x+y+z=100;

α and β that represent volume ratios of subcomponents in the main component satisfy 35 (vol %) ≤ α ≤ 65 (vol %), 35 (vol %) ≤ β ≤ 65 (vol %), and α+β=100; and when the minor components are respectively represented by aZnO, bB$_2$O$_3$, and cglass, a, b, and c that represent mass ratios of the respective minor components to the main component satisfy 0.0 (mass %) ≤ a ≤ 4.75 (mass %), 1.0 (mass %) ≤ b ≤ 6.5 (mass %), 3.5 (mass %) ≤ c ≤ 5.0 (mass %), b ≥ a−3, and a+b+c=10.

3. The dielectric ceramic composition according to claim 1, wherein a, b, and c that represent the mass ratios of the respective minor components to the main component satisfy 0.0 (mass %) ≤ a ≤ 4.25 (mass %), 1.0 (mass %) ≤ b ≤ 5.5 (mass %), 4.5 (mass %) ≤ c ≤ 5.0 (mass %), $b \geq a-3$, and $a+b+c=10$.

4. The dielectric ceramic composition according to claim 2, wherein a, b, and c that represent the mass ratios of the respective minor components to the main component satisfy 0.0 (mass %) $\leq a \leq$ 4.25 (mass %), 1.0 (mass %) $\leq b \leq$ 5.5 (mass %), 4.5 (mass %) $\leq c \leq$ 5.0 (mass %), $b \geq a-3$, and $a+b+c=10$.

* * * * *